Sept. 20, 1960 — C. O. SLEMMONS ET AL — 2,953,345
REACTOR DUMP VALVE
Filed Oct. 8, 1956
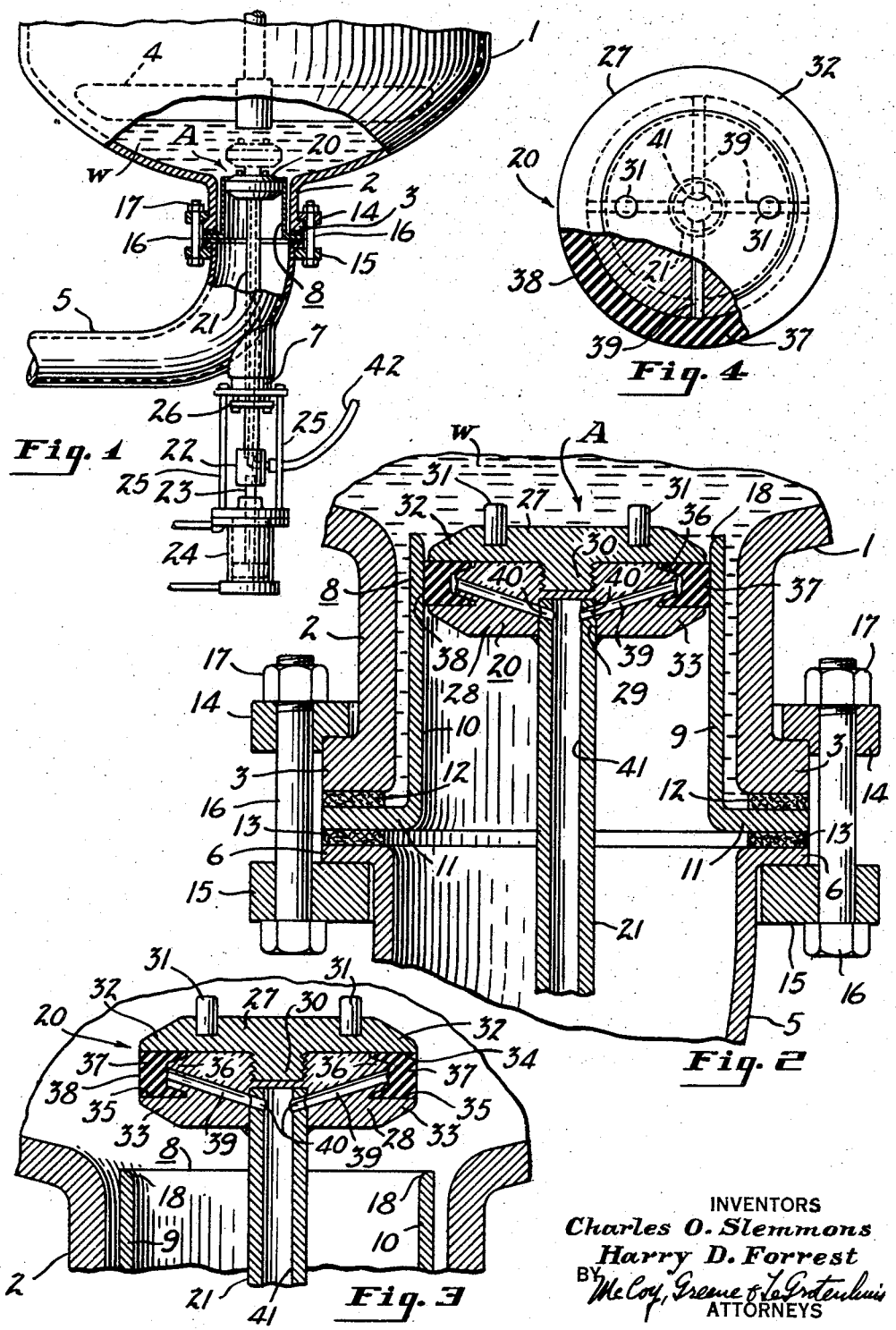
INVENTORS
Charles O. Slemmons
Harry D. Forrest
BY McCoy, Greene & La Ortentuis
ATTORNEYS United States Patent Office 2,953,345
Patented Sept. 20, 1960

2,953,345

REACTOR DUMP VALVE

Charles O. Slemmons, Akron, and Harry D. Forrest, Ashtabula, Ohio, assignors to The General Tire & Rubber Company, Akron, Ohio, a corporation of Ohio Filed Oct. 8, 1956, Ser. No. 614,525

5 Claims. (Cl. 251—144)

The present invention relates to the draining of polymerization tanks and more particularly to a novel dump valve which functions effectively at the bottom of a polymer reactor tank even though the material from the reactor tends to form a film on the metal portions at the drain opening which would interfere with the operation of valves of the type used heretofore.

Prior to the present invention it has been customary to use poppet valves to close the openings at the bottom of polymer reactors to prevent leakage from the reactor during polymerization and to permit draining of the reactor and removal of the polymer. In making polyvinyl chloride, for example, it was necessary to disassemble and clean the reactors frequently due to the fact that the deposits on the surfaces of the valve prevented the valve from seating properly.

The present invention overcomes prior difficulties by providing a valve at the bottom of the polymer reactor having an internally cylindrical sleeve and a cylindrical valve head which reciprocates within the sleeve and moves out of the sleeve to permit draining of the polymer tank. The valve head is provided with a sealing ring of elastic material which may be expanded by fluid pressure against the internal cylindrical surface of the valve sleeve to provide an effective seal even though the surfaces of the valve have a film deposited thereon. The deposits on the valve do not present a serious problem since the valve tends to scrape itself clean when it is opened and closed and since the rubber sealing element can seal effectively even when engaging the deposited film. The novel construction also permits reciprocation of the valve head so as to scrape any film from the internal surface of the valve sleeve.

Another feature of the invention is in preventing leakage of material from the reactor tank around the sealing ring into the passages through which the fluid pressure is applied to the sealing rings. The sealing rings are so shaped that the high pressure within the bottom portion of the reactor forces the sealing ring against the rigid portion of the valve head so as to seal off the fluid passages.

An object of the present invention is to provide a dump valve for polymer reactors which functions effectively for long periods of time.

A further object of the invention is to provide a self-cleaning valve for a polymer reactor so that frequent shut-downs are avoided.

A still further object of the invention is to provide a dump valve for a polymer reactor which provides a more effective seal at the bottom of the reactor and is not damaged by materials within the reactor.

Other objects of the invention are to provide a valve of simple and inexpensive construction, which does not wear out readily in service and which may readily be removed from the polymer reactor, and to provide apparatus which is easy to assemble and disassemble and may be cleaned readily.

Other objects, uses and advantages of the invention will become apparent to those skilled in the art from the following description and claims and from the drawings in which:

Figure 1 is a fragmentary side elevational view on a reduced scale with parts broken away and shown in vertical cross-section, showing the dump valve of the present invention and the polymerization apparatus associated therewith, the valve head being shown in solid lines in its normal closed position and in dot-dash lines in its normal open position;

Figure 2 is a fragmentary vertical sectional view of the apparatus shown in Fig. 1 on a larger scale, the valve being shown in its closed position when pressure is applied to the sealing ring to prevent leakage from the reactor;

Figure 3 is a fragmentary vertical sectional view showing the dump valve of Figs. 1 and 2 in its open position corresponding to the position shown in dot-dash lines in Fig. 1, the sealing ring being shown in its radially contracted position as it appears when it is subjected to a high pressure at the bottom of the reactor; and Figure 4 is a top view of the head of the valve shown in Fig. 3 on the same scale as Figs. 2 and 3 with parts broken away and shown in horizontal cross-section.

Referring more particularly to the drawings, in which like parts are identified by the same numerals throughout the several views, Figs. 1 to 3 show the bottom portion of a generally cylindrical reactor tank 1 with a volumetric capacity of around 3,000 gallons having a cylindrical mouth or neck 2 providing a discharge opening at the bottom of the tank and having means for agitating the liquid in the tank including a mechanical stirrer 4, which is rotated about a vertical axis by means of a suitable motor (not shown). The neck 2 has an annular radially projecting flange 3 to permit attachment of a large hollow metal elbow 5 having an annular radially projecting flange 6. The elbow 5 provides a large pipe to convey liquids from the discharge opening of the reactor tank and has a solid metal packing gland boss 7 welded thereto to provide a guide for the valve stem. A dump valve A is provided at the top of the neck 2 coaxial with the stirrer 4 and the tank 1 and below the stirrer as shown in Fig. 1, said valve comprising a metal sleeve 8 and a circular valve head 20, which are drawn accurately to scale in Figs. 2, 3 and 4.

The valve sleeve 8 has a cylindrical portion 9, with an axial length not substantially less than that of the neck 2, having a smooth cylindrical internal surface 10 which is coaxial with the neck 2 and a flat annular radially extending flange 11 which is located midway between the flanges 3 and 6, as best shown in Fig. 2. Annular gaskets 12 and 13 are provided on each side of the annular flange 11 to prevent leakage of liquid between the flanges 3 and 6 when these flanges are clamped together. The parts are clamped in any suitable manner, for example, by a pair of split slip-on flanges or rings 14 and 15, a series of circumferentially spaced vertical bolts 16 and a series of hexagonal nuts 17, as will be apparent from Figs. 1 and 2.

The valve head 20 may be shaped exactly as shown in Figs. 2, 3 and 4, which are drawn to scale. Said valve head is rigidly connected by welding or other suitable means to a hollow vertical cylindrical valve stem or rod 21 which is coaxial with the sleeve portion 9 and the neck 2. The valve stem extends vertically through an opening in the boss 7 and is rigidly connected to a coupling block 22. The other end of the coupling block is rigidly connected to a vertical piston rod 23 of a suitable fluid motor 24. The motor 24 may be a conventional diaphragm type motor but is shown schematically herein as a reciprocating double-acting fluid motor which may be operated either hydraulically or pneumatically to reciprocate the valve stem 21 and the head 20.

As herein shown, the housing for the motor 24 is rigidly supported from the boss 7 by means of a series of circumferentially spaced vertical parallel rods 25, said rods being attached to suitable flanges carried by the boss 7 and the motor housing as will be apparent from Fig. 1. The rods 25 may be readily detached and the piston rod 23 may be readily detached from the valve stem 21 so that the motor 24 may be removed. This permits movement of the valve head 20 axially along the full length of the valve sleeve 8 to scrape any deposits from the internal surface of said sleeve.

A suitable packing gland follower 26 having suitable sealing means therein is provided at the bottom end of the boss 7 to prevent any leakage from the elbow 5 along the outer surface of the valve stem 21. Any suitable means may be provided for engaging the valve stem throughout its circumference to guide the valve stem axially and to prevent leakage while guiding the valve stem and preventing movement thereof out of its vertical position. Where means is provided by the packing gland boss to guide the valve stem, it is unnecessary to provide auxiliary guides below the valve head 20 for engaging the sleeve 8 when the valve is open as shown in Fig. 3.

The valve head 20 shown herein comprises upper and lower metal portions 27 and 28 of the same diameter which are coaxial. The lower portion 28 has an aligned centrally located recess to receive the upper end portion 29 of the valve stem and to receive the projecting threaded portion 30 of the valve cap 27, the portion 29 having a tight fit in the lower opening and/or being welded to the portion 28 and the upper opening being internally threaded so that the upper portion 27 may be tightened against the flat upper surface of the portion 28 by screwing the threaded portion 30 into the threaded hole. In order to facilitate tightening and loosening of the portions 27 and 28 the upper portion 27 is provided with holes to receive short vertical chamfered pins 31 for engaging a suitable spanner wrench.

When the upper and lower portions 27 are rigidly connected, as shown in Figs. 2 and 3, they are coaxial with each other and with the sleeve 8 and provide an annular groove therebetween for receiving a sealing ring, the marginal portion 32 of the valve cap 27 and the marginal portion 33 of the main head portion 28, located above and below the sealing ring groove, respectively, being tapered in a similar manner and of substantial trapezoidal radial cross section as shown in the drawings. The flat bottom surface of the marginal portion 32 is horizontal and spaced from and parallel to the flat horizontal upper surface of the marginal portion 33, said flat surfaces forming top and bottom sides of the groove which receives the sealing ring. The lower portion 27 of the valve head has an annular radially projecting portion 36 midway between the surfaces 34 and 35 and coaxial with the valve sleeve 8 and the stem 21, which portion 36 has the same trapezoidal radial vertical cross section throughout its circumference as shown in Figs. 2 and 3. The annular groove between the marginal portions 32 and 33 therefore has a uniform vertical cross section through its circumference and is symmetrical with respect to a horizontal medial plane.

This groove is completely filled by an annular sealing ring 37 of flexible extensible elastomeric material, said sealing ring also being symmetrical. In its normal unstressed condition the sealing ring 37 completely fills the circumferential groove and has an external cylindrical surface 38 of the same diameter as the circular portions 27 and 28 as best shown in Fig. 3. If desired the sealing ring may project a small fraction of an inch beyond the members 27 and 28. The sealing ring 37 may be made of a rubber or rubber-like plastic which is not damaged by the materials employed in the reactor tank 1. The ring should retain its elasticity for substantial periods of time when used at the bottom of the reactor tank and should have a long life so that the tank will not be shut down often due to failure of the sealing ring. It has been found that ordinary rubbers are damaged when used at the bottom of a tank used for the polymerization of vinyl chloride. When forming a polyvinyl chloride it is preferable to employ an elastic polyurethane rubber for the sealing ring 37. Such polyurethane rubber is not damaged by the materials in the reactor tank and functions effectively for long periods of time.

Any suitable means may be provided for forcing the sealing ring radially outwardly against the internal surface 10 of the valve sleeve to prevent leakage of fluid from the reactor tank. Such means preferably employs a fluid pressure so as to provide a highly effective seal. As herein shown the lower rigid metal portion 28 of the valve head is provided with four radial passages 39 of small diameter which are aligned with small openings 40 in the top portion 29 of the valve stem. The openings 40 lead to a cylindrical passage 41 in the valve stem which extends the full length of the valve stem to the opening in the coupling block 22, said openings also communicating with a flexible supply hose or conduit 42. A suitable fluid, preferably hydraulic, is supplied from a source of pressure (not shown) through the hose 42 and the passages 39, 40 and 41 to the inner surface of the sealing ring 37 while the valve head 20 is in the closed position as shown in Fig. 2.

Since the pressure of the liquid $w$ within the reactor tank 1 on the valve A will exceed 50 pounds per square inch, it is necessary to employ pressures higher than 50 pounds per square inch within the passages 39 to 41. Such sealing pressures cause the sealing ring 37 to stretch radially outwardly and compresses the sealing ring against the internal surface 10 of the valve sleeve and axially against the flat surfaces 34 and 35 so as to prevent leakage of pneumatic or hydraulic fluid from the passages 39 around the sealing ring and so as to prevent leakage of liquid from the reactor tank 1.

Before opening the valve A the pressure within the lines 39 to 41 is reduced materially, in some instances to atmospheric pressure, so that the sealing ring contacts and the surface 38 thereof has a diameter less than that of the valve sleeve surface 10. The valve head 20 is then moved by the motor 24 from the closed position of Fig. 2 to the open position of Fig. 3 allowing the emulsified liquid and the polymers within the tank 1 to drain out through the elbow 5.

As the valve is opened the sealing ring 37 is subjected to the pressure of the liquid in the bottom of the filled tank which is higher than 50 p.s.i., such pressure tending to force liquid around the sealing ring into the passages 39. However, the sealing ring 37 is shaped to prevent any passage of liquid from the tank into the passages 39. The inwardly projecting portions of the sealing ring above and below the annular metal portion 36 presses against the inclined surfaces of the portion 36 to prevent leakage toward the passages 39 and the central portion of the sealing ring presses radially inwardly against the cylindrical surface of the portion 36 and at the margins of the passages 39 to seal off the entrance into these passages as is apparent from Fig. 3. As seen in Fig. 3 each passage 39 is inclined and extends from the opening 40 through the portion 36, the exit opening from the portion 36 being located at the medial plane of the portion 36 midway between the surfaces 34 and 35. The sealing ring 37 effectively prevents leakage of material from the reactor tank into the passages 39 which could clog the passages or interfere with the operation of the sealing ring.

The boss 7 accurately guides the stem 21 so that the valve head 20 remains coaxial with the valve sleeve 8 during the opening and closing movements. However, it is preferable to provide rounded edges 18 at the upper end of the valve sleeve 8 to prevent damage to the parts in the event there is a slight misalignment, the tapered bottom surface of the marginal portion 33 also facilitating closing movement of the valve. When it is desired to reseal the tank 1 the valve head 20 is moved downwardly to the closed position of Fig. 2 and high pressure fluid is supplied through the passages 39 to 41 to effect the seal.

The dump valve of the present invention is particularly suitable for a reactor tank used to make polyvinyl chloride. When making this material the tank 1 may be filled with several hundred gallons of an aqueous dispersion containing water, vinyl chloride, suitable organic catalysts, suitable emulsifying agents, such as soaps, and other materials including thickeners and the like. The milky aqueous emulsion after polymerization would be discharged through the neck 2 into the elbow 5 and through suitable pipes, not shown. After the reactor had been used several times to polymerize the monomeric material there would be substantial deposits on the surfaces which contacted the material from the reactor.

It will be understood that all of the metal surfaces which contact the material of the reactor should be corrosion resistant. All such surfaces are either glass lined or made of stainless steel so that they do not corrode. All of the parts of the valve sleeve 8 and the valve head 20, except the sealing ring 37, are preferably made of stainless steel.

The inner surface 10 may be highly polished and the portion 9 may be glass lined but these features are unnecessary. It will be noted that the external diameter of the valve head portions 27 and 28 is only a very small fraction of an inch less than the diameter of the valve sleeve surface 10. The opening and closing of the valve head 20, therefore, scrapes any thick deposits from the surface 10 and prevents any build-up which would interfere with operation of the valve. If desired the motor 24 may be reciprocated several times to move the head 20 up and down within its sleeve 8 to scrape the sleeve clean. It will be noted that the normal opening and closing of the valve A also keeps the valve clean at the upper end of the sleeve 8. If it is desired to clean the lower end of the sleeve 8, this may be effected merely by moving the valve head 20 downwardly or reciprocating the valve head near the bottom of the sleeve 8.

When polymerizing vinyl chloride in the tank 1, it is preferable to make the sealing ring 37 an elastic incompressible polyurethane rubber formed by reacting a slight (6 to 15 percent) molar excess of a polyisocyanate with a suitable high molecular weight polyester or polyether, for example, as described in the copending application of Gruber et al., Serial No. 535,280, filed September 19, 1955, which is assigned to the assignee of the present application. The polyurethane sealing ring may contain substantial amounts of carbon black to impart abrasion and cut resistance thereto but should have a long flex life and be highly elastic so that it may readily stretch and contract.

The polyurethane used to make the sealing ring may be a reaction product of a polyisocyanate, such as naphthalene-1,5-diisocyanate, toluene diisocyanate, 2,4-tolylene diisocyanate, methylene bis phenyl diisocyanate, methylene tris triisocyanate, or the like, with a high molecular weight linear dihydroxy compound, particularly polyesters or polyethers formed by the esterification of dibasic acids (such as succinic, adipic, pimelic, sebacic, diglycolic, phthalic, terephthalic or similar acid) with an excess of dihydroxy alcohols, such as polyalkylene glycols or other polyglycols. It is preferable to employ diisocyanates and glycols (dihydroxy compounds) so as to obtain linear thermoplastic resins. However, small amounts of cross-linking agents, such as trimethylol propane or other trihydroxy compounds may be used. The polyesters or polyethers reacted with the diisocyanates preferably have long chains and a molecular weight of 500 or more. Such polyesters may be formed by reacting a slight excess of a glycol or polyglycol with a polybasic acid. The glycol has two hydroxyl groups which are preferably located at or near the opposite ends of the molecule. The glycols employed are preferably long chain polyglycols (such as diethylene glycol, triethylene glycol or higher molecular weight polyethylene glycols, dipropylene glycol or other polypropylene glycols, dibutylene glycol or other polybutylene glycols, or other polyalkylene glycols having terminal hydroxyl groups. The glycols may also be of mixed types such as ethylene-propylene glycol, ethylene-butylene glycol, propylene-butylene glycol and other polyglycols.

Long-chain polyesters, suitable for reaction with the diisocyanates in the formation of the polyurethane, may be formed by reacting the glycol and the dibasic acid as follows:

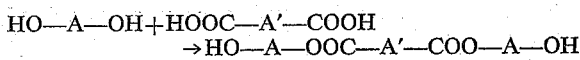

HO—A—OH+HOOC—A'—COOH
→HO—A—OOC—A'—COO—A—OH

The polyester may then be reacted with a diisocyanate such as toluene diisocyanate, p,p'-diisocyanate diphenyl methane, naphthalene-1,5-diisocyanate, bi-tolylene diisocyanate, dianisidine diisocyanate, paraphenylene diisocyanate, methaphenylene diisocyanate, meta xylylene diisocyanate, or benzidine diisocyanate, to form a long-chain flexible stretchable polyurethane, for example as described in U.S. Patent No. 2,675,531 and in said copending application, Serial No. 535,280.

It will be understood that, in accordance with the provisions of the patent statutes, variations and modifications of the specific devices disclosed herein may be made without departing from the spirit of the invention.

Having described our invention, we claim:

1. In a polymerization apparatus including a reactor tank having a discharge opening near the bottom of said tank to permit removal of liquid from said tank, an improved dump valve comprising: an internally cylindrical sleeve in said opening, a circular valve head coaxial with said sleeve and mounted for movement axially in said sleeve, and means for reciprocating said head into and out of said sleeve including a valve stem below said head and a fluid motor below said head connected to said valve stem, said head having an annular circumferential groove, the radially outermost portions of said head above and below said groove having an external diameter less but not substantially less than the internal diameter of said sleeve so that there is a small clearance between the head and the sleeve, an extensible sealing ring of elastomeric material of a size to fit in said groove mounted in said groove and having an externally cylindrical surface which may be expanded against said sleeve to prevent leakage of fluid through said discharge opening, and fluid pressure means entirely below said discharge opening for expanding said sealing ring including a source of fluid under pressure, an axial passage in said valve stem connected to said source, radial passages leading from said axial passage to said groove, and means for preventing communication between said radial passages and the exterior of said valve head said motor moving said head between an open position above and spaced from said sleeve and above said discharge opening and a closed position in said sleeve.

2. In a polymer reactor tank, an improved dump valve comprising an internally cylindrical sleeve having a vertical axis, a single circular valve head coaxial with said sleeve and mounted for vertical movement axially in said sleeve, a long valve stem connected to said head and extending downwardly therefrom, an elbow below said sleeve having sealing means for slidably receiving said stem, said sleeve discharging into the upper end of said elbow, a reciprocating piston fluid motor below said stem and outside said elbow, said motor being connected to said stem to move said head between an open position above and vertically spaced from said sleeve and a closed position in said sleeve, said head having annular circumferential groove, the radially outermost portions of said head above and below said groove having an external diameter less but not substantially less than the internal diameter of said sleeve to provide a small radial clearance between the head and the sleeve, an extensible sealing ring of elastomeric material of a size to fit in said groove mounted in said groove and having an external surface which may be expanded against said sleeve, and fluid pressure means for expanding said sealing ring including a source of fluid under pressure, an axial passage in said valve stem extending through and beyond said elbow and connected to said source, radial passages leading from said axial passage to said groove, and means for preventing communication between said radial passages and the exterior of said valve head.

3. In a polymer reactor tank, an internally cylindrical member having a vertical axis, a circular valve head coaxial with said member and mounted for vertical movement in said member, a valve stem connected to said head and extending downwardly therefrom, motor means connected to the lower end of said valve stem for moving said head between an open position above and spaced from said member and a closed position in said member, said head having an annular circumferential groove and a circumferential ridge which projects radially into said groove, the radially outermost portions of said head above and below said groove having an external diameter less but not substantially less than the internal diameter of said member to provide a small radial clearance between said head and said member, an extensible sealing ring of elastomeric material of a size to fit in said groove mounted in said groove and having an external surface which may be expanded against said member to prevent leakage of fluid, and fluid pressure means for expanding said sealing ring including a source of fluid under pressure, an axial passage in said valve stem connected to said source, radial passages leading from said axial passage to said groove, and means for preventing communication between said radial passages and the exterior of said valve head including radially inwardly projecting circumferential flanges above and below said ridge and the radially outer ends of said radial passages, which flanges engage the ridge to prevent leakage into said radial passages when the pressure in said passages is reduced to permit opening of the valve.

4. In a polymer reactor tank, a wall having a drain opening at the bottom thereof, said wall having a tapered portion extending radially outwardly and upwardly from the entrance to said opening and a continuation of said wall forming a passage extending downwardly from the entrance to said opening, cylinder means carried by said continuation of said wall below the upper surface of said wall and forming an internally cylindrical surface with a vertical axis, said surface extending upwardly to and terminating at said entrance, a circular valve head coaxial with said surface and mounted for vertical movement in said cylinder means, fluid motor means entirely below said head and reciprocating said head between an open position above and vertically spaced from said cylindrical surface and above said wall and a closed position in said cylinder means within said cylindrical surface, said last-named means including a valve stem connected to said head and extending downwardly therefrom, said head having an annular circumferential groove and being the only valve head carried on said valve stem, the radially outermost portions of said head above and below said groove having an external diameter slightly less than the internal diameter of said surface to provide a small radial clearance therebetween, an extensible sealing ring of elastomeric material mounted in and filling said groove, said sealing ring having an externally cylindrical surface which may be expanded against said internally cylindrical surface to prevent leakage, and fluid pressure means for expanding said sealing ring including a source of fluid under pressure, an axial passage in said valve stem connected to said source, radial passages leading from said axial passage to said groove, and means for preventing communication between said radial passages and the exterior of said valve head.

5. In combination, a polymer reactor tank with a capacity of several thousand gallons having a wall with a drain opening at the bottom thereof, said wall having a portion extending radially outwardly and upwardly from the entrance to said opening and a continuation of said wall forming a passage extending downwardly from the entrance to said opening, cylinder means carried by said continuation of said wall below the upper surface of said wall and forming an internally cylindrical surface with a vertical axis, said surface extending upwardly to and terminating at said entrance, a circular valve head coaxial with said surface and mounted for vertical movement in said cylinder means, means entirely below said head and reciprocating said head between an open position above and vertically spaced from said cylindrical surface and above said wall and a closed position in said cylinder means within said cylindrical surface, said last-named means including a valve stem connected to said head and extending downwardly therefrom, said head having an annular circumferential groove, the portions of said head above and below said groove having an external diameter slightly less than the internal diameter of said surface to provide a small radial clearance therebetween, an extensible sealing ring of elastomeric material mounted in and filling said groove, said sealing ring having an externally cylindrical surface which may be expanded against said internally cylindrical surface to prevent leakage, and fluid pressure means for expanding said sealing ring including a source of fluid under pressure, an axial passage in said valve stem connected to said source, radial passages leading from said axial passage to said groove, and means for preventing communication between said radial passages and the exterior of said valve head, said fluid pressure means applying a pressure within said passages greater than 50 pounds per square inch.

References Cited in the file of this patent

UNITED STATES PATENTS

| | | |
|---|---|---|
| 704,402 | Taylor | July 8, 1902 |
| 1,635,321 | Hinkley | July 12, 1927 |
| 1,652,510 | Allen | Dec. 13, 1927 |
| 2,293,269 | Rufus | Aug. 18, 1942 |
| 2,325,802 | Schmidt | Aug. 3, 1943 |
| 2,395,533 | Clem | Feb. 26, 1946 |
| 2,413,869 | Hamer | Jan. 7, 1947 |
| 2,481,013 | Henderson | Sept. 6, 1949 |

FOREIGN PATENTS

| | | |
|---|---|---|
| 678,371 | France | Dec. 24, 1928 |
| 488,194 | Canada | Nov. 18, 1952 |